United States Patent
Duan et al.

(10) Patent No.: US 7,946,156 B2
(45) Date of Patent: May 24, 2011

(54) GLIDE TEST HEADS USING HEATING ELEMENTS TO FORM A PLANAR DETECTION SURFACE

(75) Inventors: Shanlin Duan, Fremont, CA (US); Jizhong He, San Jose, CA (US); Bruno Marchon, Palo Alto, CA (US); Ullal V. Nayak, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 632 days.

(21) Appl. No.: 11/964,688

(22) Filed: Dec. 26, 2007

(65) Prior Publication Data

US 2009/0165539 A1 Jul. 2, 2009

(51) Int. Cl.
*G11B 5/455* (2006.01)
*G01B 7/34* (2006.01)
*G01B 5/28* (2006.01)

(52) U.S. Cl. .......................................... 73/104; 73/1.89

(58) Field of Classification Search .......... 73/1.79–1.81, 73/1.89, 104–105
See application file for complete search history.

(56) References Cited

U.S. PATENT DOCUMENTS

| | | | |
|---|---|---|---|
| 5,808,184 A | | 9/1998 | Boutaghou et al. |
| 6,140,814 A | * | 10/2000 | Sundaram .................... 73/105 X |
| 6,216,242 B1 | * | 4/2001 | Schaenzer .................... 714/723 |
| 6,262,572 B1 | | 7/2001 | Franco et al. |
| 6,366,416 B1 | | 4/2002 | Meyer et al. |
| 6,369,900 B1 | | 4/2002 | Sundaram et al. |
| 6,433,966 B1 | | 8/2002 | Tang et al. |
| 6,580,572 B1 | | 6/2003 | Yao et al. |
| 6,771,453 B2 | * | 8/2004 | Baumgartner et al. ......... 360/75 |
| 6,883,368 B2 | * | 4/2005 | Smith et al. ..................... 73/105 |
| 6,899,456 B2 | | 5/2005 | Sundaram et al. |
| 7,124,625 B1 | | 10/2006 | Kurita et al. |
| 7,153,192 B1 | | 12/2006 | Kurita et al. |
| 7,153,193 B1 | | 12/2006 | Kurita et al. |
| 7,770,438 B2 | * | 8/2010 | Kiyono et al. .................. 73/104 |
| 2006/0092570 A1 | | 5/2006 | Payne et al. |
| 2008/0259480 A1 | * | 10/2008 | Pham et al. ................. 73/104 X |

FOREIGN PATENT DOCUMENTS

| | | |
|---|---|---|
| JP | 5028472 | 2/1993 |
| JP | 9304009 | 11/1997 |
| JP | 2003030824 | 1/2003 |
| JP | 2004185783 | 7/2004 |

OTHER PUBLICATIONS

"Adjustable Burnish Slider using thermal expansion for HDD applications", IBM Research Disclosure, vol. 449, Art. 449129 (Sep. 2001).

Hajji, "Closed Loop Optimal Tandem Burnish/Glide Process With Variable Load", IBM Technical Disclosure Bulletin, RO8870002 (Nov. 1988).

* cited by examiner

*Primary Examiner* — Thomas P Noland
(74) *Attorney, Agent, or Firm* — Duft Bornsen & Fishman, LLP

(57) ABSTRACT

Glide test systems and associated methods are described. A glide test system includes a glide test head that is flown over the surface of a recording disk to detect asperities on the recording disk. The glide test head includes a detection pad on the trailing end of the head. Heating elements are fabricated proximate to the detection pad. The heating elements are independently controllable to control the amount of protrusion of different regions of the detection pad. The heating elements thus provide a way to substantially flatten the detection surface of the detection pad, and compensate for an uneven topography on a detection surface.

16 Claims, 8 Drawing Sheets

GLIDE TEST HEADS USING HEATING ELEMENTS TO FORM A PLANAR DETECTION SURFACE

BACKGROUND OF THE INVENTION

1. Field of the Invention

The invention is related to the field of glide test systems and, in particular, to a glide test head that incorporates heating elements to create a substantially planar surface on the glide test head.

2. Statement of the Problem

Many computer systems use magnetic disk drives for mass storage of information. Magnetic disk drives typically include one or more magnetic recording heads (sometimes referred to as sliders) that include read elements and write elements. An actuator/suspension arm holds the recording head above a magnetic disk. When the magnetic disk rotates, an air flow generated by the rotation of the magnetic disk causes an air bearing surface (ABS) side of the recording head to fly a particular height above the magnetic disk. The fly height depends on the shape of the ABS. As the recording head flies on the air bearing, an actuator moves an actuator/suspension arm to position the read element and the write element over selected tracks of the magnetic disk.

The magnetic disks are typically manufactured by sputtering a plurality of layers onto a substrate, such as a magnetic recording layer, an overcoat, a lubricant layer, etc. After the sputtering process, small protrusions may exist on the surface of the magnetic disk. These small protrusions are referred to as asperities. To remove the asperities from the surface of the magnetic disk, a burnishing process is performed.

For the burnishing process, a burnishing head is formed on a trailing end of a burnishing slider. The burnishing head is then placed in contact with the surface of the magnetic disk while the magnetic disk is rotated. The burnishing head is moved from the inner radius of the magnetic disk to the outer radius of the magnetic disk to remove asperities on the surface of the disk. However, some of the asperities may not be removed by the burnishing process, so a glide testing process is then performed to detect whether asperities remain on the surface of the magnetic disk.

For the glide testing process, the magnetic disk is placed in a glide test system which resembles a disk drive. The glide test system includes a glide test head having an air bearing surface (ABS). The glide test head is similar to a slider, but does not include a read and write element on a trailing end as does a slider. Instead, the glide test head includes a detection pad on its trailing end. The detection pad has a detection surface that is parallel to the ABS and is adapted to contact asperities that protrude from the surface of the magnetic disk. The glide test head also includes a sensing element, such as a piezoelectric sensor.

To perform glide testing on the magnetic disk, the magnetic disk is rotated and the glide test head flies a particular height above the magnetic disk. The height at which the glide test head flies is referred to as the glide height. The ABS of the glide test head is formed so that the glide height of the glide test head is dependent on the velocity at which the magnetic disk is rotated. Thus, the velocity is adjusted to position the glide test head at a desired glide height. A typical glide height presently used is 6 nanometers. If an asperity exists on the surface of the magnetic disk, then the asperity will contact the detection surface of the detection pad. The contact with the asperity creates a vibration in the glide test head which is detected by the sensing element. If asperities are detected on the surface of the magnetic disk, then the magnetic disk may be burnished another time, or may be discarded.

One problem with present glide testing is that the detection surface may not be sufficiently flat to accurately detect asperities on the magnetic disk. The width of a detection pad on a typical glide test head may be 100 microns to 300 microns. Over these widths, there may be an uneven topography (e.g., slight curves, rolls, or ripples) along the detection surface due to normal imperfections in the fabrication processes. Over a width of 100-300 microns, it is common for the topography of the detection surface to have a 2 nanometer peak-to-peak variation, or even more. When the desired glide height is around 6 nanometers, a 2 nanometer variation along the detection surface may negatively affect the quality of the glide testing process.

SUMMARY OF THE SOLUTION

Embodiments of the invention solve the above and other related problems with glide test heads that include a plurality of heating elements proximate to the detection pad. The heating elements are adapted to be independently controlled (i.e., independent currents may be applied to each heating element). The regions of the detection pad that correspond with the locations of the heating elements protrude based on the amount of heat applied by the heating elements. Consequently, the detection surface of the detection pad may be flattened through the independent control of the heating elements.

The heating elements as described herein may be advantageously used to compensate for an uneven topography on the detection surface of the detection pad. For instance, the peak-to-peak variation in topography may be reduced from 2 nanometers down to less than about 0.5 nanometers. With the detection surface substantially planar, the glide height of the glide test head is more accurate, and the glide test head may more accurately detect asperities on the surface of a magnetic disk.

One embodiment of the invention comprises a glide test head for testing the surface of a recording disk. The glide test head includes a main body having an air bearing surface (ABS), and a detection pad on a trailing end of the main body. The detection pad has a detection surface that is substantially parallel to the ABS. The glide test head further includes a plurality of heating elements fabricated along a width of the detection pad. The heating elements are adapted to be independently controlled so that the detection surface is substantially planar along the width of the detection pad.

Another embodiment of the invention comprises a method of performing a glide testing process using the glide test head described above. The heating elements of the glide test head correspond with regions of the detection surface of the detection pad. An independent current is applied to the heating elements of the glide test head to cause protrusions in the regions of the detection surface that correspond with the locations of the heating elements. The heights of the regions of the detection surface are then detected relative to the surface of the recording disk. The independent currents applied to the heating elements may then be adjusted responsive to the detected heights of the regions of the detection surface. The adjustments to the independent currents are made to substantially flatten the detection surface.

The invention may include other exemplary embodiments described below.

DESCRIPTION OF THE DRAWINGS

The same reference number represents the same element or same type of element on all drawings.

DETAILED DESCRIPTION OF THE INVENTION

Figure 1:
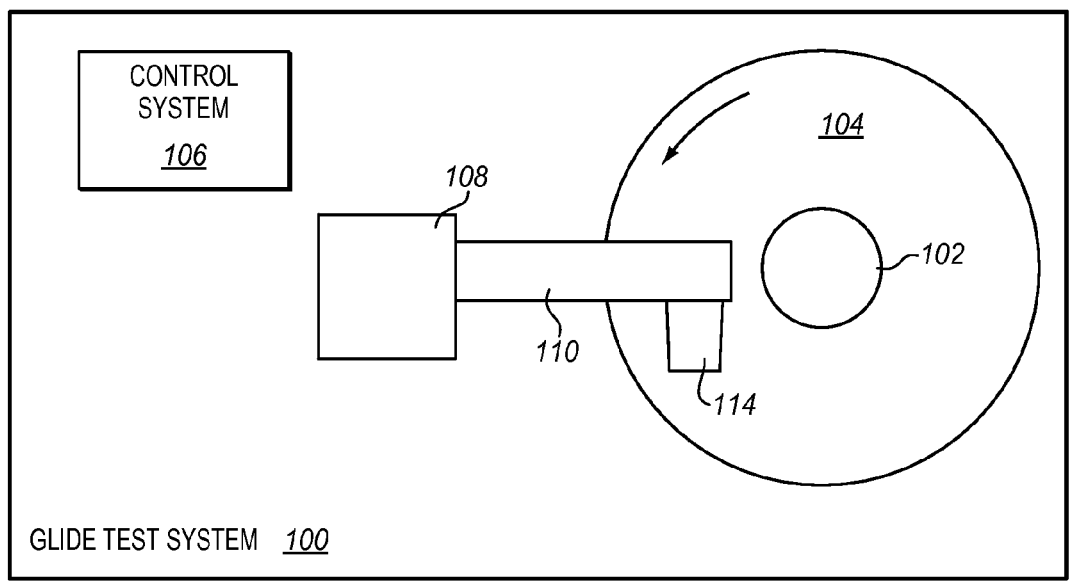
FIG. 1 illustrates a glide test system.

FIG. 1 illustrates a glide test system 100. Glide test system 100 includes a spindle 102, a recording disk 104, a control system 106, an actuator 108, an actuator/suspension arm 110, and a glide test head 114. Spindle 102 supports and rotates recording disk 104 in the direction indicated by the arrow. A stepper motor (not shown) moves the spindle 102 linearly according to control signals from control system 106. Glide test head 114 is supported by actuator/suspension arm 110. Actuator/suspension arm 110 is connected to actuator 108 that is configured to rotate in order to position glide test head 114 over desired locations of recording disk 104. Glide test system 100 may include other devices, components, or systems not shown in FIG. 1. For instance, a plurality of actuators, actuator/suspension arms, and glide test heads may be used.

Figure 2:
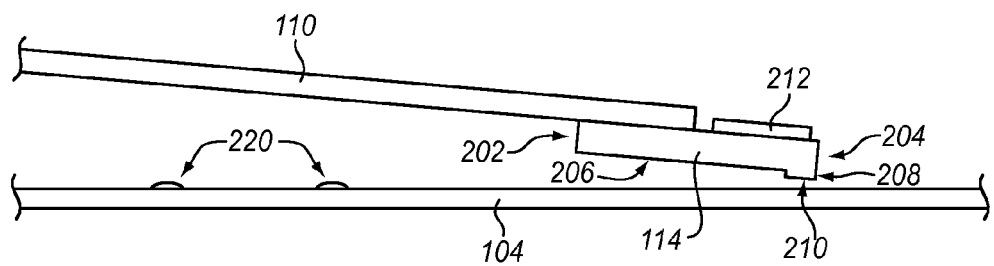
FIG. 2 is a side view of a glide test system.

FIG. 2 is a side view of glide test system 100. Glide test head 114 is supported above the surface of recording disk 104 by actuator/suspension arm 110. Glide test head 114 includes a front end 202 and an opposing trailing end 204. Glide test head 114 also includes an air bearing surface 206 that faces toward the surface of recording disk 104. A detection pad 208 is fabricated on the trailing end 204 of glide test head 114. The bottom surface (i.e., the surface facing toward recording disk 104) is parallel to ABS 206. This bottom surface of detection pad 208 is referred to herein as the detection surface 210.

Glide test head 114 further includes a sensing element 212 that is adapted to sense vibrations or heat in glide test head 114. One example of sensing element 212 is a piezoelectric sensor made from materials such as piezoelectric ceramics (i.e., Lead zirconate titanate (PZT) ceramics) and single crystal materials.

To perform a glide testing process, control system 106 (see FIG. 1) rotates recording disk 104 at a desired velocity. When recording disk 104 rotates, an air flow generated by the rotation of recording disk 104 causes the ABS 206 of glide test head 114 to fly on a cushion of air at a desired glide height above recording disk 104. The glide height of glide test head 114 generally depends on the velocity of rotation of recording disk 104. Control system 106 may vary the rotational velocity of recording disk 104 in order to achieve the desired glide height.

As glide test head 114 flies over the surface of recording disk 104, actuator 108 moves actuator/suspension arm 110 to scan glide test head 114 over the surface of recording disk 104. This glide testing process is used to detect asperities on the surface of recording disk 104. For example, two asperities 220 are illustrated in FIG. 2. Assume for this example that the height of the asperities 220 is greater than 6 nanometers. If the glide height of glide test head 114 is set at 6 nanometers, then the asperities 220 will contact detection surface 210 when they pass underneath glide test head 114. The contact between detection surface 210 and asperities 220 causes a vibration in glide test head 114 that is detected by sensing element 212. Sensing element 212 is electrically connected to control system 106 (see FIG. 1) or another system, and provides signals indicating the existence of the asperities 220 on the surface of recording disk 104.

Figure 3:
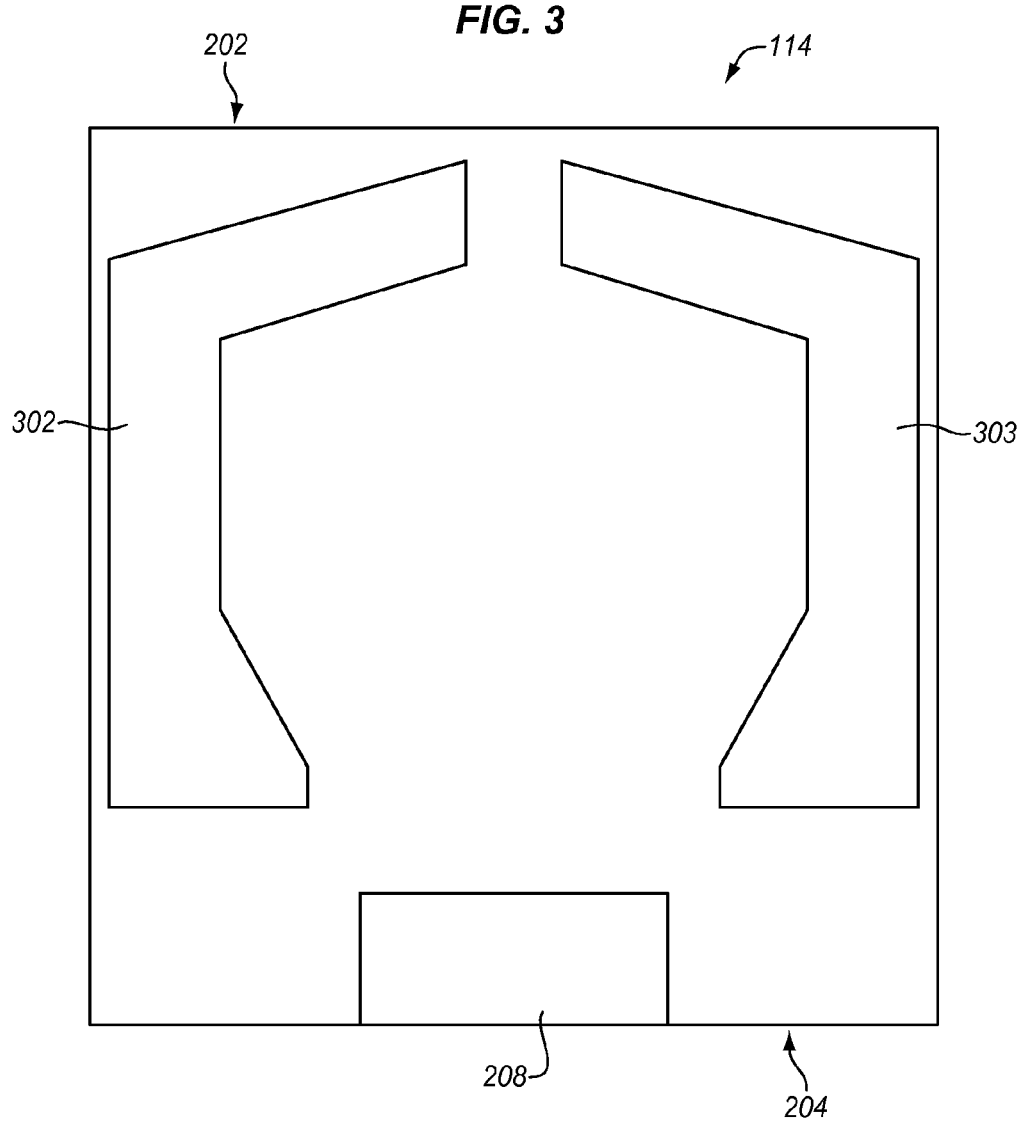
FIG. 3 is a view of the air bearing surface of a glide test head.

FIG. 3 is a view of the ABS 206 of glide test head 114. ABS 206 has a particular pattern so that glide test head 114 flies a desired glide height above recording disk 104 (see FIG. 2). ABS 206 may have different desired patterns, and rails 302-303 are shown just for illustration. Detection pad 208 is formed toward the trailing end 204 of glide test head 114. The detection surface (not shown with a reference number) of detection pad 208 faces outward in FIG. 3.

Figure 4:
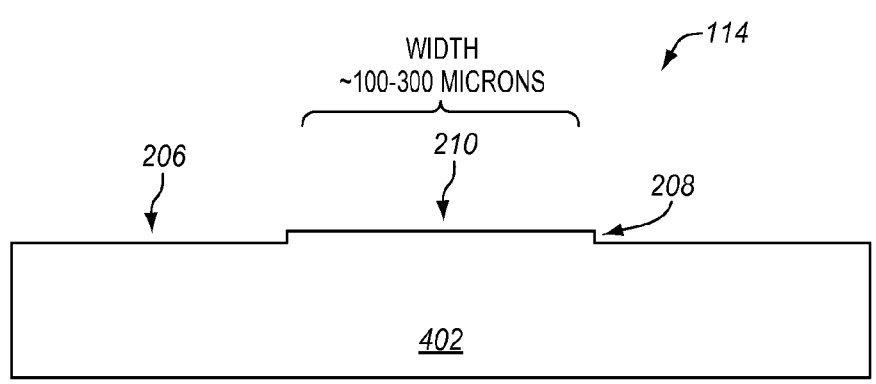
FIG. 4 is a view of a glide test head from the trailing end of the head.

FIG. 4 is a view of glide test head 114 from the trailing end 204. The ABS 206 of glide test head 114 is facing upward in FIG. 4, as is detection surface 210. From this view of glide test head 114, detection pad 208 protrudes partially out of the ABS 206 of the main body (illustrated as reference number 402) of glide test head 114. Those skilled in the art will appreciate that detection pad 208 may protrude a desired amount from the ABS 206.

Figure 5:
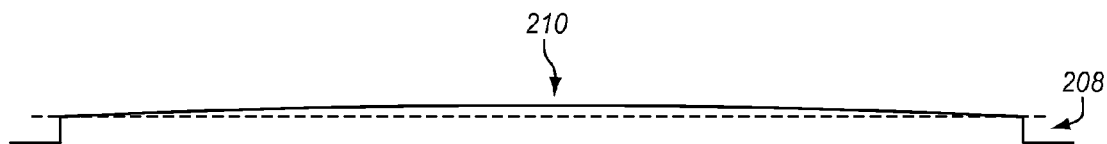
FIGS. 5-7 illustrate examples of uneven topography on the detection surface of a glide test head.
Figure 6:
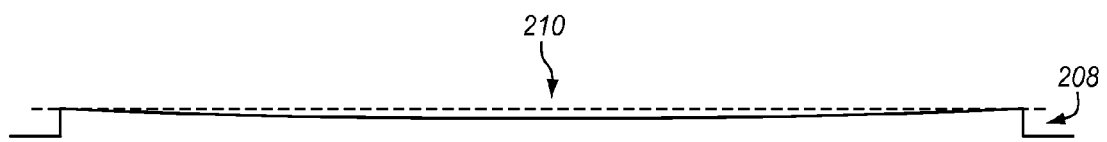
Figure 7:
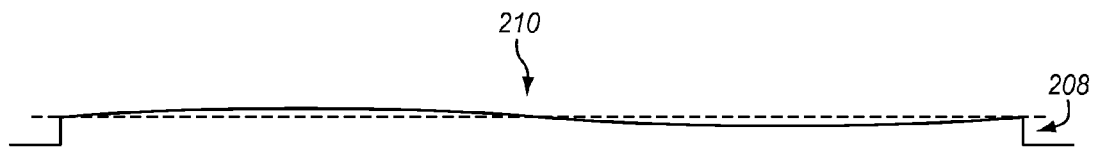

To make the glide testing process more efficient, the width of detection pad 208 may be 100 microns to 300 microns, or even more. As mentioned in the Background, over these widths, there may be an uneven topography (e.g., slight curves, rolls, or ripples) along detection surface 210 due to normal imperfections in the fabrication processes. FIGS. 5-7 illustrate examples of an uneven topography on detection surface 210. FIG. 5 is a cross-sectional view of detection pad 208. In the example of FIG. 5, detection surface 210 has a convex or rounded topography over the width of detection pad 208. The dotted line in FIG. 5 illustrates a desired plane for detection surface 210 if this surface were flat. FIG. 6 is another cross-sectional view of detection pad 208. In the example of FIG. 6, detection surface 210 has a concave topography over the width of detection pad 208. FIG. 7 is another cross-sectional view of detection pad 208. In the example of FIG. 7, detection surface 210 has a rolling topography over the width of detection pad 208. Due to the uneven topographies shown in FIGS. 5-7 and other topographies formed due to fabrication processes, detection surface 210 may have a 2 nanometer peak-to-peak variation, or even more.

Such variations in detection surface 210 are problematic and can negatively affect the accuracy of the glide testing process. The embodiments provided below solve these problems by implementing independently-controllable heating elements in the glide test head to substantially flatten detection surface 210 and compensate for uneven topography.

FIGS. 8-16 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 8:
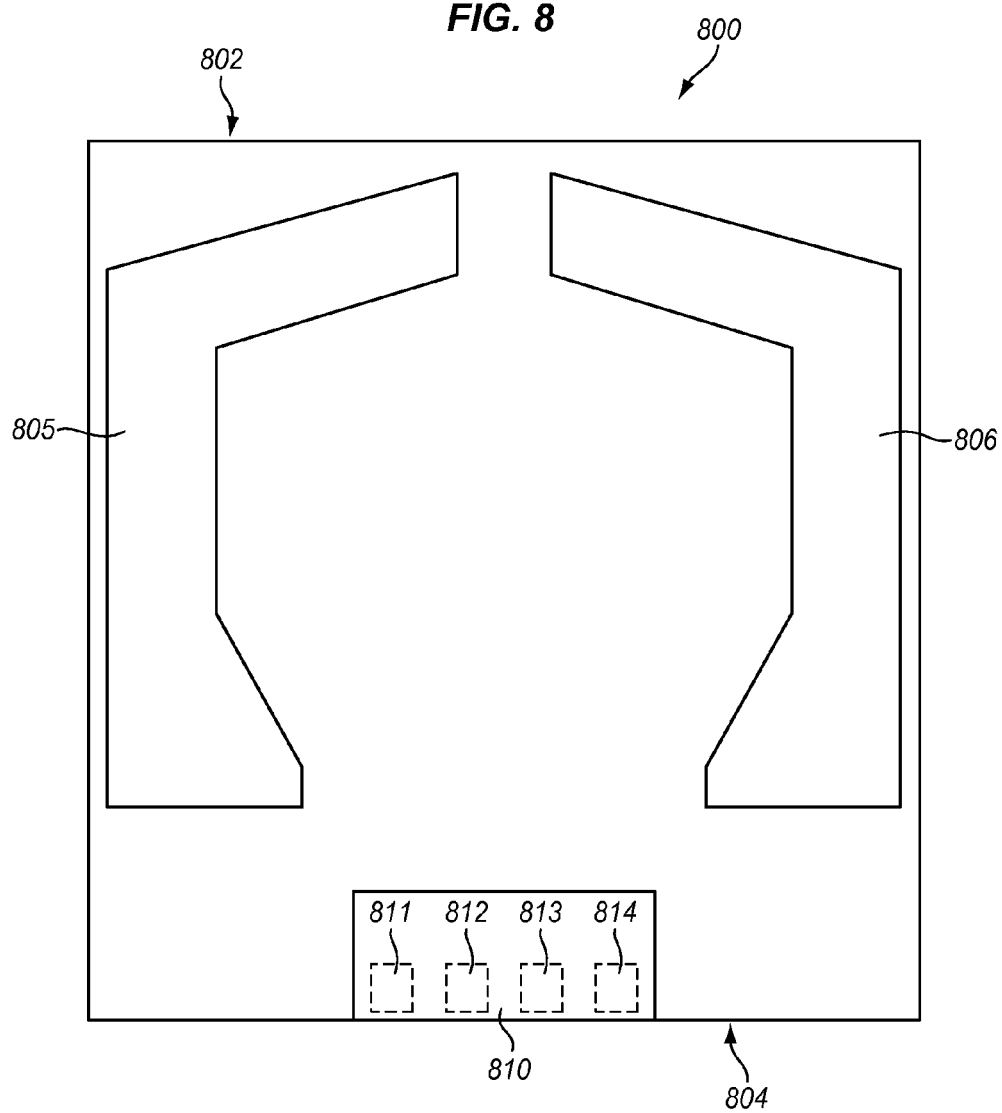
FIG. 8 is a view of an air bearing surface of a glide test head in an exemplary embodiment of the invention.

FIG. 8 is a view of the air bearing surface (ABS) of a glide test head 800 in an exemplary embodiment of the invention. Glide test head 800 is shown as being similar to glide test head 114 as in FIGS. 1-4. More particularly, glide test head 800 has a front end 802 and a trailing end 804. The ABS of glide test head 800 (which is the surface of the page of FIG. 8) also includes rails 805-806, although any desired pattern may be formed on the ABS. Glide test head 800 also includes a detection pad 810 that is formed proximate to trailing end 804. The detection surface (not shown with a reference number) of detection pad 810 faces outward in FIG. 8. As with glide test head 114, glide test head 800 includes a sensing element (not shown), such as a piezoelectric sensor. Glide test head 800 may be implemented in a glide test system, such as is illustrated in FIGS. 1-2.

In this embodiment, glide test head 800 further includes heating elements 811-814 that are formed proximate to detection pad 810. Heating elements 811-814 (or heaters) are illustrated as dotted box in FIG. 8 to show that heating elements 811-814 are fabricated in glide test head 114 when viewed from the ABS. A heating element comprises any element that produces heat when a current is applied, such as a coil, a resistive element, etc. Those skilled in the art will appreciate that FIG. 8 is not meant to illustrate the size, shape, and precise location of the heating elements 811-814, but merely to show that heating elements 811-814 are formed proximate to detection pad 810.

Figure 9:
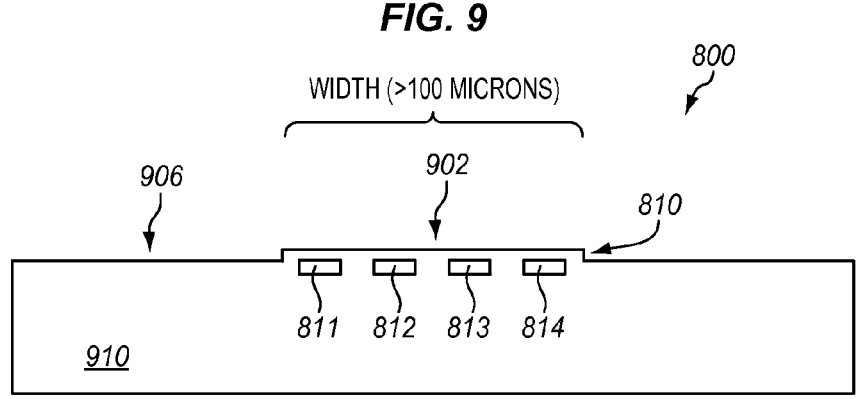
FIG. 9 is a cross-sectional view of a glide test head in an exemplary embodiment of the invention.

FIG. 9 is a cross-sectional view of glide test head 800 in an exemplary embodiment of the invention. The ABS 906 of glide test head 800 is facing upward in FIG. 9, as is detection surface 902. From this view of glide test head 800, detection pad 810 protrudes partially out of the ABS 906 of the main body (illustrated as reference number 910) of glide test head 800. Those skilled in the art will appreciate that detection pad 810 may protrude a desired amount from the ABS 906 (without the application of heat).

Heating elements 811-814 are fabricated along the width of detection pad 810. Although four heating elements 811-814 are shown, glide test head 800 may include more or less heating elements 811-814 in other embodiments. Detection pad 810 has a width greater than about 100 microns. Heating elements 811-814 may form any desired array along the width of detection pad 810. The size, shape, spacing, and location of the heating elements 811-814 may be adjusted as desired.

Detection pad 810 is formed from a thermally-expansive material. When current is applied to heating elements 811-814, the heating elements 811-814 radiate heat proximate to detection pad 810. Responsive to the heat, detection pad 810 expands relative to main body 910 so that detection pad 810 protrudes further from the ABS 906 of glide test head 800. As a result, detection surface 902 moves toward a recording disk (not shown) that is adjacent to detection surface 902.

Heating elements 811-814 in this embodiment are independently controllable. To be independently controllable, heating elements 811-814 are each connected in such a way that an independent current is applied to each heating element 811-814. As a result, the amount of current applied to each heating element 811-814 can be independently controlled, and consequently, the amount of heat radiated from each heating element 811-814 can be controlled. This configuration allows the heating elements 811-814 to substantially flatten detection surface 902 to account for topography variations existing on detection surface 902.

Figure 10:
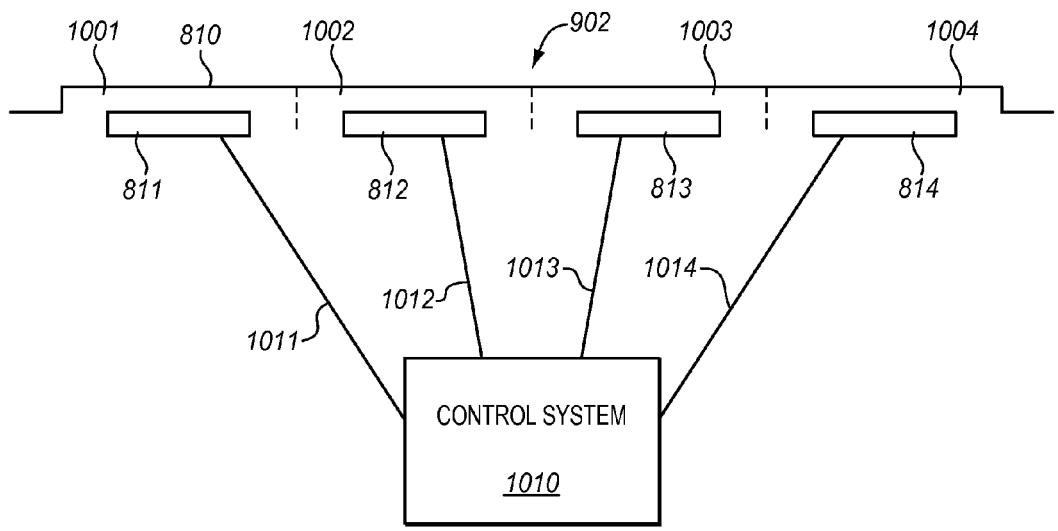
FIG. 10 illustrates a cross-sectional view of a detection pad and heating elements of a glide test head in an exemplary embodiment of the invention.

FIG. 10 illustrates a cross-sectional view of detection pad 810 and heating elements 811-814 in an exemplary embodiment of the invention. Heating elements 811-814 are illustrated as a linear array along the width of detection pad 810. Again, those skilled in the art will appreciate that heating elements 811-814 may be formed in different arrays in other embodiments. Each heating element 811-814 corresponds with a region of detection pad 810. For example, heating element 811 corresponds with region 1001 of detection pad 810. Heating element 812 corresponds with region 1002 of detection pad 810. Heating element 813 corresponds with region 1003 of detection pad 810. Heating element 814 corresponds with region 1004 of detection pad 810.

Heating elements 811-814 are connected to a control system 1010 through a plurality of electrical traces 1011-1014, respectively. Electrical traces 1011-1014 are independent from one another, meaning that they are not connected. Heating elements 811-814 may share a common ground, but traces 101-1014 are not connected. Because traces 1011-1014 are independent, control system 1010 is able to apply an independent current to each heating element 811-814. By applying different currents to heating elements 811-814, control system 1010 can control how much each region 1001-1004 of detection pad 810 protrudes from the ABS 906. The amount of protrusion of each region 1001-1004 can be used to flatten detection surface 902.

For example, if it is determined that detection surface 902 dips in region 1001 in relation to regions 1002-1004, then control system 1010 may apply a higher current to heating element 811 as compared to the current applied to heating elements 812-814. The higher current applied to heating element 811 causes region 1001 of detection pad 810 to protrude further, which compensates for the dip in detection surface 902 found in region 1001. A further explanation of the process of controlling heating elements 811-814 is described in FIG. 11.

Figure 11:
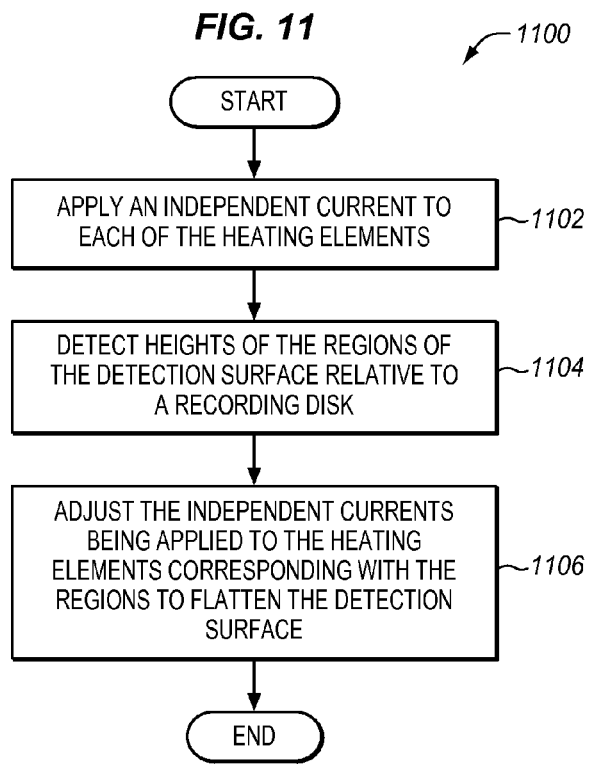
FIG. 11 is a flow chart illustrating a method of controlling heating elements of a glide test head in an exemplary embodiment of the invention.

FIG. 11 is a flow chart illustrating a method 1100 of controlling the heating elements 811-814 of glide test head 800 in an exemplary embodiment of the invention. Method 1100 is described in relation to the system shown in FIG. 10. Method 1100 is not all-inclusive, and may include other steps not shown in FIG. 11.

In step 1102, control system 1010 applies an independent current to each heating elements 811-814. As previously described, the independent current causes the regions 1001-1004 of detection pad 810 to protrude an amount commensurate with the current applied to the heating element 811-814 corresponding with that region.

In step 1104, control system 1010 detects the heights of the regions 1001-1004 of detection surface 902 relative to the surface of a recording disk that is adjacent to detection surface 902. Assume for step 1104 that glide test head 800 is replacing glide test head 114 in glide test system 100 (see FIGS. 1-2). Detection surface 902 would then be adjacent to the surface of recording disk 104.

In step 1106, control system 1010 adjusts the independent current applied to heating elements 811-814 based on the detected heights of detection surface 902 in each region 1001-1004. The adjustments made by control system 1010 are to make the heights in each region 1001-1004 substantially the same relative to the surface of recording disk 104. For example, if it is detected that region 1001 is further away from recording disk 104 (i.e., a larger height), then control system 1010 may increase the current applied to heating element 811 so that region 1001 of detection pad 810 protrudes further and reduces the height of region 1001 relative to recording disk 104. Similarly, if control system 1010 detects that region 1004 is closer to recording disk 104 (i.e., a smaller height), then control system 1010 may decrease the current applied to heating element 814 so that region 1004 of detection pad 810 does not protrude as far and increases the height of region 1004 relative to recording disk 104.

This process of independently controlling the current applied to heating elements 811-814 allows control system 1010 to substantially flatten detection surface 902. Thus, if there are variations in topography in detection surface 902, such as illustrated in FIGS. 5-7, control system 1010 is able to adjust the heating elements 811-814 accordingly to compensate for these variations. The result is a detection surface 902 that is substantially planar.

Figure 12:
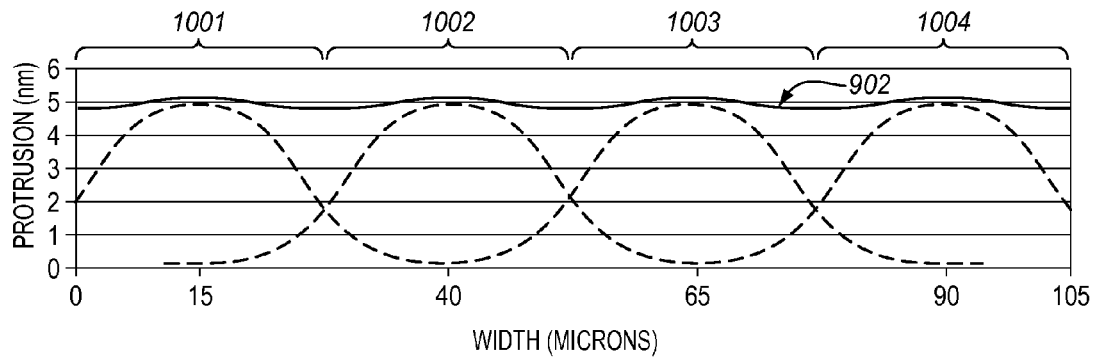
FIG. 12 is a graph illustrating how heating elements flatten a detection surface of a detection pad in an exemplary embodiment of the invention.

FIG. 12 is a graph illustrating how heating elements 811-814 flatten detection surface 902 in an exemplary embodiment of the invention. Assume for this embodiment that detection pad 810 in FIG. 10 has a width of about 105 microns, and heating elements 811-814 are spaced apart by about 25 microns. The four curves (dotted lines) in the graph of FIG. 12 illustrate the amount of protrusion of regions 1001-1004 due to the independent currents applied to heating elements 811-814. Each heating element 811-814 causes its corresponding region 1001-1004 to protrude about 5 nanometers. In order to achieve a protrusion of about 5 nanometers, the current applied to each heating element 811-814 may be different. The result is that detection surface 902 is substantially flat over the width of 105 microns. As illustrated in FIG. 12, detection surface 902 is not perfectly flat, but the peak-to-peak variations in the topography of detection surface 902 are less than about 0.5 nanometers. This small of a variation still provides for accurate detection of asperities on a recording disk.

Another advantage of glide test head 800 is that if multiple glide test heads 800 are used in a glide test system, such as glide test system 100, then each of the glide test heads 800 can be adjusted to create a flat detection surface 810 and with the same amount of protrusion. For instance, assume that two glide test heads 800 are used to test opposing surfaces of a recording disk. The detection surfaces 810 of the two glide test heads 800 may not have the same topography, so the heating elements 811-814 in each of the glide test heads 800 may be adjusted so that the detection surfaces 810 on both glide test heads 800 are substantially flat. When both are substantially flat, both glide test heads 800 can perform a simultaneous test scan. Presently, because the heads are usually mismatched, the scans of the two opposite surfaces of a disk have to be done in sequence in order to achieve the same fly height with different rotation speeds. This slows down the throughput.

Figure 13:
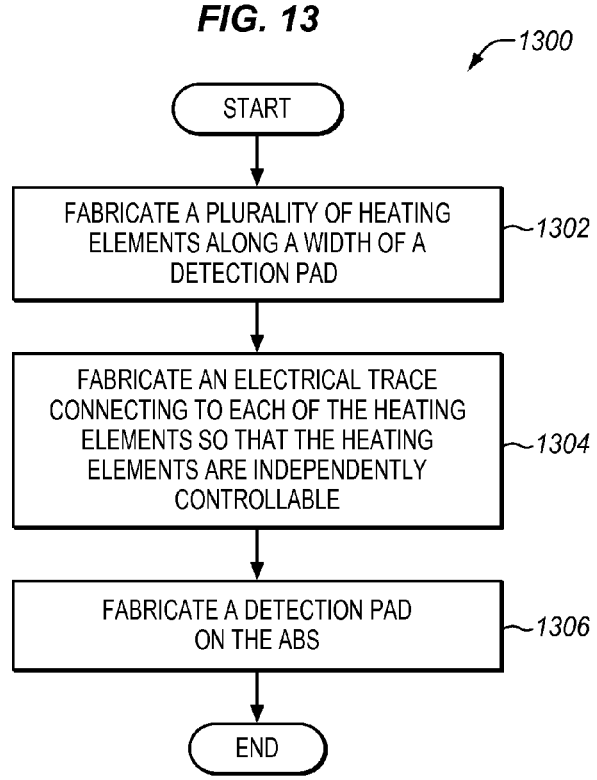
FIG. 13 is a flow chart illustrating a method of fabricating a glide test head in an exemplary embodiment of the invention.
Figure 14:
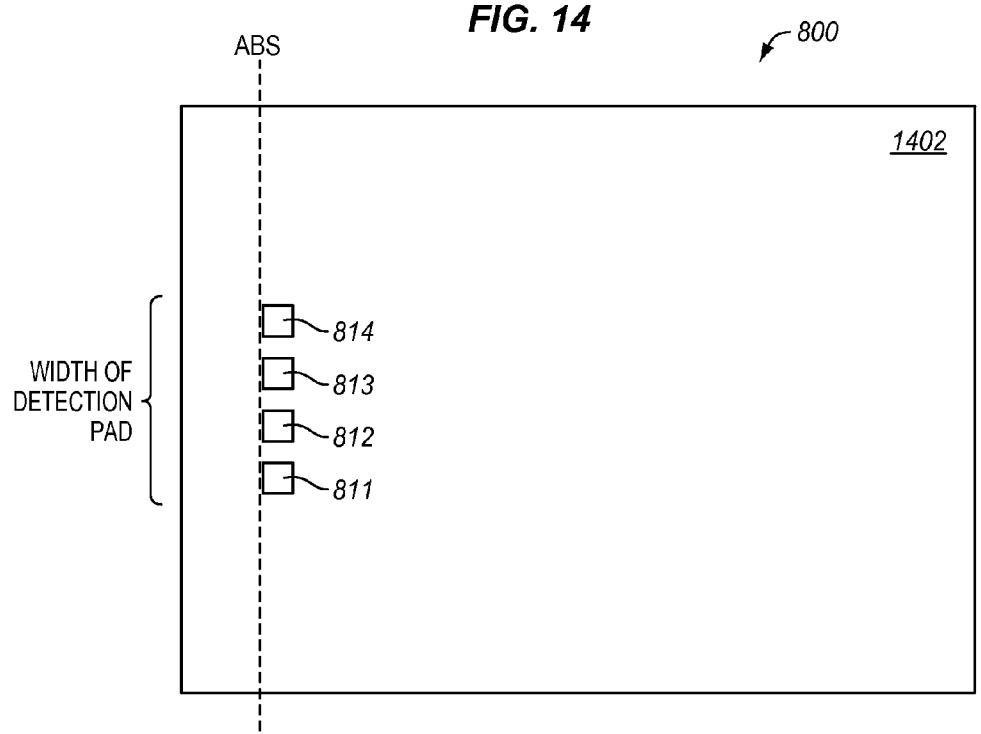
FIGS. 14-16 illustrate a glide test head being fabricated according to the method of FIG. 13 in exemplary embodiments of the invention.
Figure 15:
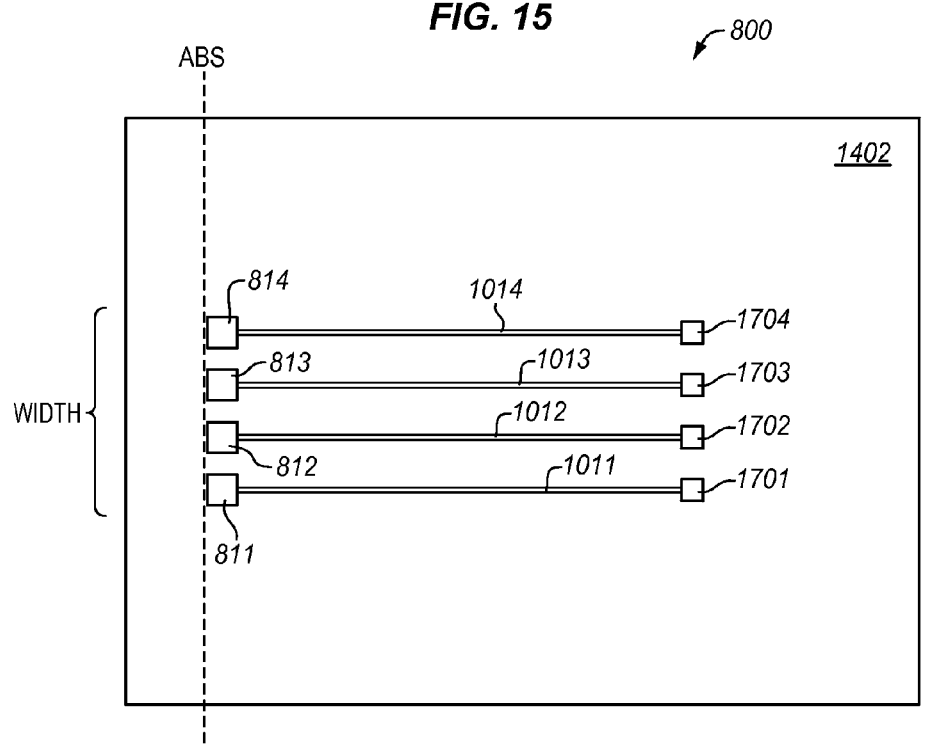
Figure 16:
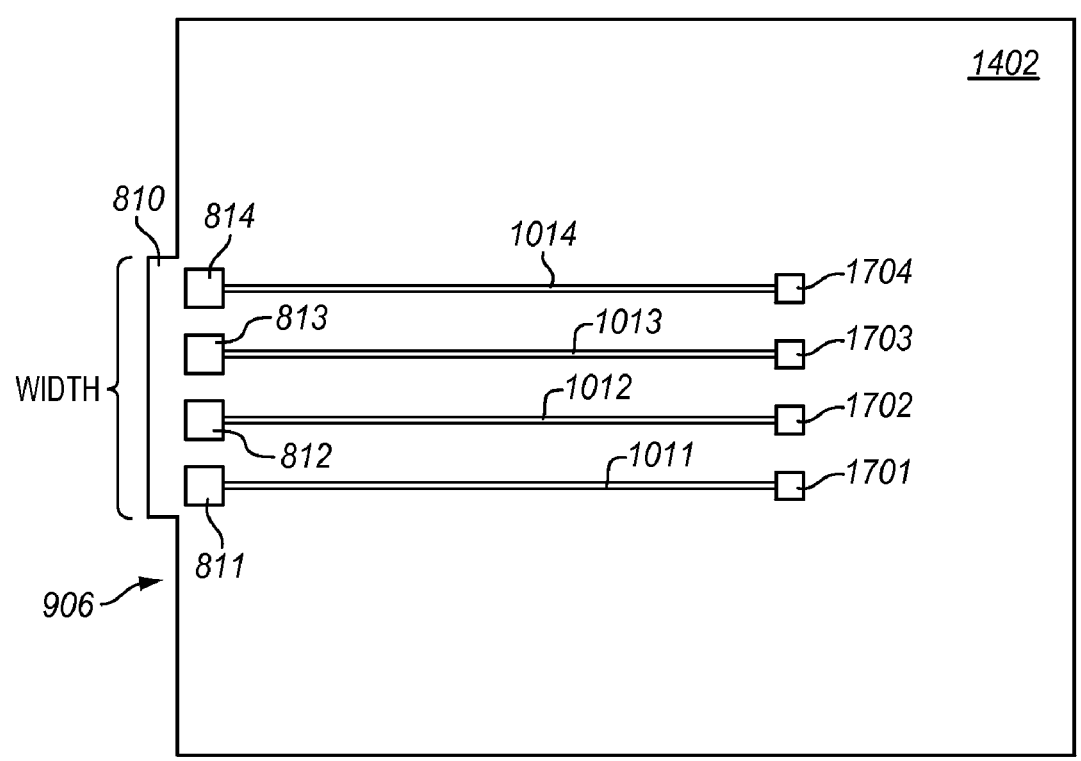

FIG. 13 is a flow chart illustrating a method 1300 of fabricating a glide test head 800 in an exemplary embodiment of the invention. FIGS. 14-16 illustrate a glide test head 800 being fabricated according to method 1300. Method 1300 is not all-inclusive, and may include other steps not shown in FIG. 13.

Step 1302 comprises fabricating a plurality of heating elements 811-814 along a width of a future detection pad 810. FIG. 14 is a top view of heating elements 811-814 fabricated according to step 1302. Heating elements 811-814 are fabricated along the width of the location of detection pad 810, which will be defined in a subsequent fabrication process. The top view of FIG. 14 shows that heating elements 811-814 are formed in a linear array along the future width of detection pad 810 proximate to the future ABS. Heating elements 811-814 may be fabricated in a variety of ways. For instance, heating elements 811-814 may be fabricated by forming coils from conductive materials. Heating elements 811-814 may be formed from magnetoresistance (MR) materials, from semiconductor materials, or from some other components or materials. Because FIG. 14 illustrates wafer fabrication, the ABS 906 of glide test head 800 is yet to be defined and consequently detection pad 810 has yet to be defined.

Step 1304 of FIG. 13 comprises fabricating an electrical trace 1011-1014 connecting to each of heating elements 811-814. Electrical traces 1011-1014 are formed from an electrically-conductive material, such as copper. FIG. 15 is a top view of glide test head 800 in an exemplary embodiment. Each electrical trace 1011-1014 independently connects to a heating element 811-814. Although the ground connections for heating elements 811-814 may be common, electrical traces 1011-1014 are not connected so that an independent current may be applied to each heating element 811-814. Traces 1011-1014 may be fabricated to connect to an electrical pad that is formed or will be formed on glide test head 800. Exemplary electrical pads 1701-1704 are illustrated in FIG. 17. Electrical pads 1701-1704 represent points where a system, such as control system 1010 (see FIG. 10), may be connected to apply independent currents to traces 1011-1014.

After heating elements 811-814 and electrical traces 1011-1014 are fabricated, other layers of glide test head 800 are deposited at wafer level. The wafer is then cut into rows, and a lapping process and other processes are performed to form the ABS 906 of glide test head 800. As part of this process, step 1306 of FIG. 13 comprises fabricating a detection pad 810 on ABS 906 of glide test head 800. FIG. 16 is a top view of detection pad 810 fabricated according to step 1306. Detection pad 810 is etched or otherwise defined on ABS 906 to have a desired shape and size.

Method 1300 includes further steps (not shown) that complete fabrication of glide test head 800. When completed, glide test head 800 resembles that shown in FIGS. 8-9. Glide test head 800 may then be installed in a glide test system, such as shown in FIGS. 1-2, and used for glide testing processes.

Although specific embodiments were described herein, the scope of the invention is not limited to those specific embodiments. The scope of the invention is defined by the following claims and any equivalents thereof.

We claim:

1. A glide test head for testing the surface of a recording disk, the glide test head comprising:
   a main body having an air bearing surface (ABS);
   a detection pad on a trailing end of the main body having a detection surface substantially parallel to the ABS; and
   a plurality of heating elements fabricated along a width of the detection pad;
   wherein the heating elements are adapted to be independently controlled so that the detection surface is substantially planar along the width of the detection pad.

2. The glide test head of claim 1 wherein the width of the detection pad is at least 100 microns.

3. The glide test head of claim 2 wherein the heating elements are linearly spaced along the width of the detection pad.

4. The glide test head of claim 1 further comprising:
   a plurality of electrical traces, wherein an independent electrical trace connects to each of the heating elements so that the heating elements are independently controllable.

5. A glide test system for testing the surface of a recording disk, the glide test system comprising:

a glide test head comprising:
   a main body having an air bearing surface (ABS);
   a detection pad on a trailing end of the main body having a detection surface substantially parallel to the ABS; and
   a plurality of heating elements fabricated along a width of the detection pad; and
a control system adapted to independently control the heating elements so that the detection surface is substantially planar along the width of the detection pad.

6. The glide test system of claim 5 wherein the width of the detection pad is at least 100 microns.

7. The glide test system of claim 6 wherein the heating elements are linearly spaced along the width of the detection pad.

8. The glide test system of claim 5 further comprising:
   a plurality of electrical traces, wherein an independent electrical trace connects to each of the heating elements and the control system.

9. The glide test system of claim 5 wherein each of the heating elements corresponds with a region of the detection surface, and wherein the control system is further adapted to:
   detect heights of the regions of the detection surface relative to the surface of the recording disk; and
   adjust an independent current applied to the heating elements based on the detected heights of the regions of the detection surface.

10. A method of performing a glide testing process to detect asperities on a recording disk using a glide test head, wherein the glide test head includes a detection pad having a detection surface substantially parallel to an air bearing surface of the glide test head, and a plurality of heating elements fabricated along a width of the detection pad that are independently controllable, the method comprising:
   applying independent currents to the heating elements of the glide test head to cause protrusions in the regions of the detection surface that correspond with the locations of the heating elements;
   detecting heights of the regions of the detection surface relative to the surface of the recording disk; and
   adjusting the independent currents applied to the heating elements responsive to the detected heights of the regions of the detection surface to substantially flatten the detection surface.

11. The method of claim 10 wherein a peak-to-peak variation in a topography of the detection surface is less than about 0.5 microns responsive to adjusting the independent currents.

12. A glide test head for testing the surface of a recording disk, the glide test head comprising:
   a main body having an air bearing surface (ABS);
   a detection pad on a trailing end of the main body having a detection surface substantially parallel to the ABS; and
   an array of heating elements fabricated along a width of the detection pad, wherein each heating element corresponds with a region of the detection pad;
   wherein each of the heating elements is adapted to be independently controlled to cause a protrusion in the corresponding region of the detection pad which substantially flattens the topography of the detection surface.

13. The glide test head of claim 12 wherein the width of the detection pad is at least 100 microns.

14. The glide test head of claim 13 wherein the array of heating elements is linearly spaced along the width of the detection pad.

15. The glide test head of claim 12 further comprising:
   a plurality of electrical traces, wherein an independent electrical trace connects to each of the heating elements so that the heating elements are independently controllable.

16. The glide test head of claim 12 wherein a peak-to-peak variation in the topography of the detection surface is less than about 0.5 microns responsive to independent control of the heating elements.

\* \* \* \* \*

UNITED STATES PATENT AND TRADEMARK OFFICE
CERTIFICATE OF CORRECTION

| | |
|---|---|
| PATENT NO. | : 7,946,156 B2 |
| APPLICATION NO. | : 11/964688 |
| DATED | : May 24, 2011 |
| INVENTOR(S) | : Duan et al. |

Page 1 of 1

It is certified that error appears in the above-identified patent and that said Letters Patent is hereby corrected as shown below:

In column 6, line 23, the text "101-1014" should read -- 1011-1014 --.

Signed and Sealed this
Twenty-fifth Day of October, 2011

David J. Kappos
*Director of the United States Patent and Trademark Office*